No. 799,544. PATENTED SEPT. 12, 1905.
C. A. DENNIS.
FRAME FOR BUILDINGS.
APPLICATION FILED DEC. 5, 1904.

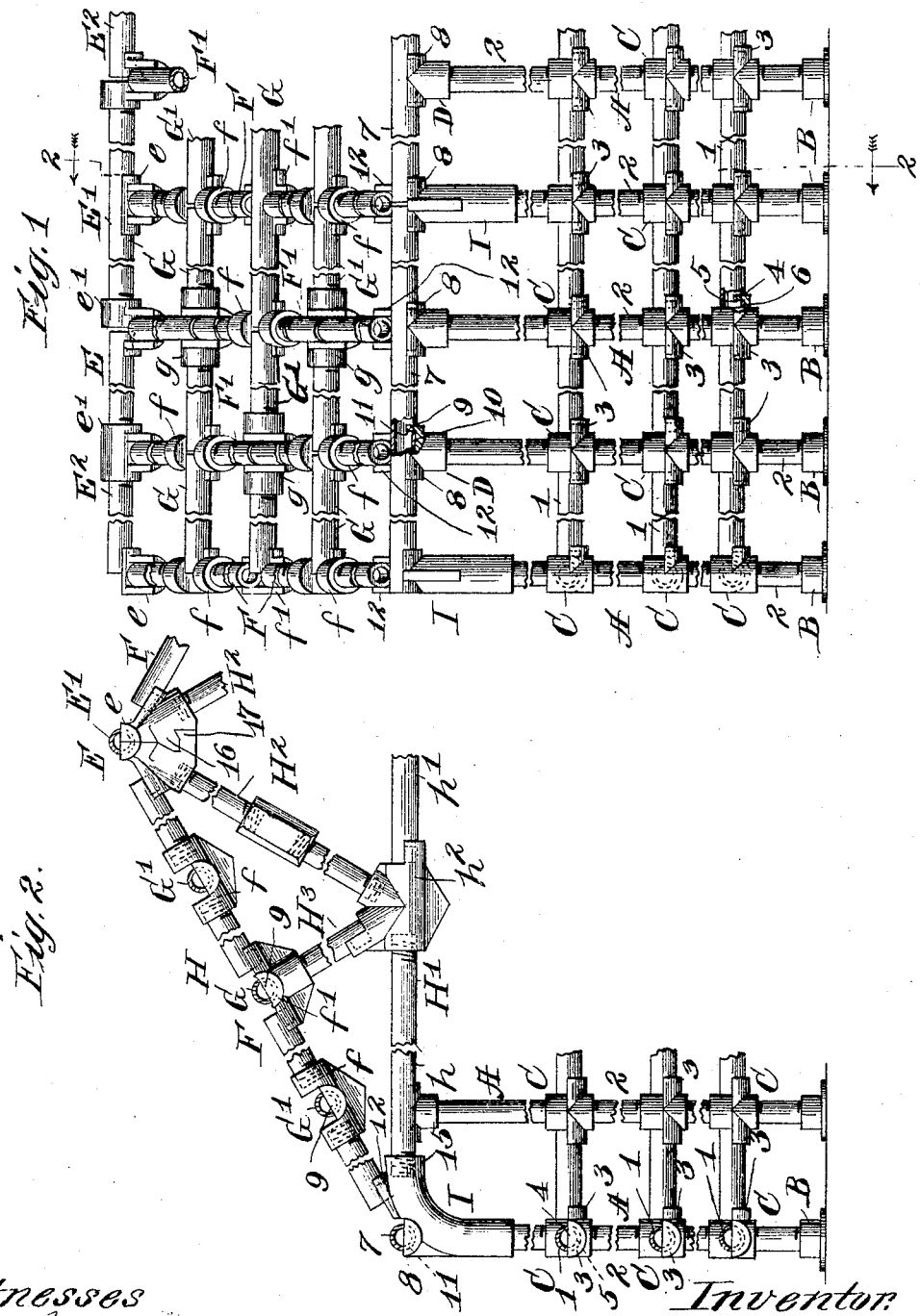

2 SHEETS—SHEET 2.

Witnesses.
G. A. Paukerschmidt
Chas. B. Gillson.

Inventor.
Charles A. Dennis,
By Geo. E. Waldo,
Atty.

UNITED STATES PATENT OFFICE.

CHARLES A. DENNIS, OF CHICAGO, ILLINOIS.

FRAME FOR BUILDINGS.

No. 799,544.   Specification of Letters Patent.   Patented Sept. 12, 1905.

Application filed December 5, 1904. Serial No. 235,445.

*To all whom it may concern:*

Be it known that I, CHARLES A. DENNIS, a citizen of the United States, and a resident of Chicago, in the county of Cook and State of Illinois, have invented certain new and useful Improvements in Frames for Buildings, of which the following is a specification.

This invention relates to frames for buildings and other structures.

Among the objects of the invention are to provide a frame for a building made of sections of pipe, as gas-pipe, which may be prepared ready for erection at a shop and which when ready for erection will consist of sections of such lengths and shapes that they may be conveniently handled and shipped, and to provide fittings for connecting said sections of pipe comprising screw-threaded joints designed to be made and assembled at the shop and interlocking joints consisting of slots formed in the sections of pipe which engage suitable flanges on said fittings to provide for quickly and conveniently connecting the sections of pipe in erecting the structure. To effect these ends, a building-frame of my invention consists of the various features, combinations of features, and details of construction hereinafter described and claimed.

Figure 6:
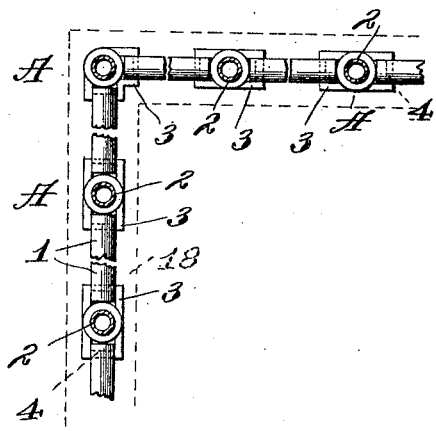
Figure 3:
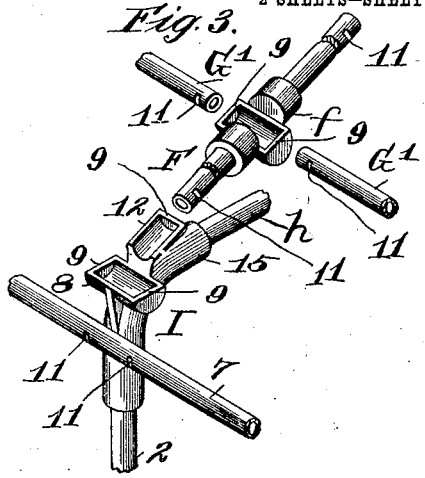
Figure 4:
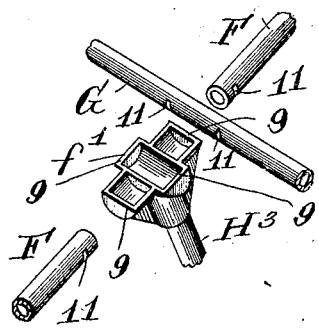
Figure 5:
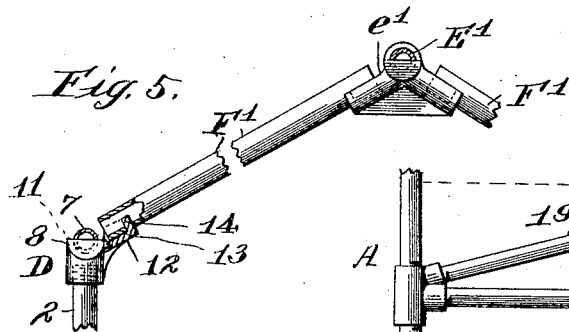
Figure 7:
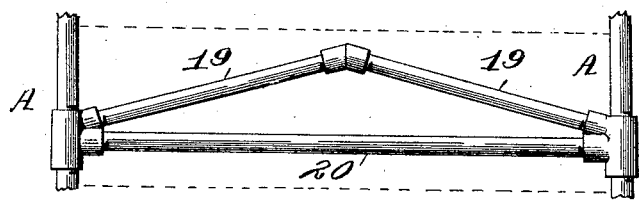

In the accompanying drawings, in which a building-frame of my invention is fully illustrated, Figure 1 is a partial side elevation of a building-frame of my invention. Fig. 2 is a partial sectional view thereof on the line 2 2 of Fig. 1. Figs. 3, 4, and 5 illustrate different forms of fittings for use in making different connections. Fig. 6 is a partial horizontal sectional view of a building comprising a frame of my invention and a concrete wall (indicated by dotted lines) in which said frame is embedded, and Fig. 7 is a view illustrating an approved form of reinforced concrete floor structure.

The side and end walls of a building-frame of my invention consist of upright tubular members or pipes A of desired length and of a size to provide adequate strength, connected in the plane of said side and end walls by transverse tie-rods or braces 1. As shown, said upright frame members A are secured to the floor by means of usual floor flanges or connections B, to which the lower ends of said upright frame members A are threaded.

The upright frame members A consist of sections of pipe 2, connected by means of fittings C, the lengths of the sections 2 being equal to the desired distance between adjacent tie-rods or braces 1. The sections 2 of the upright frame members A are screw-threaded into the fitting C, which sections may be made in whole or in part at the shops, depending upon the total lengths of said upright members A. The transverse tie-rods or braces 1 are connected to the upright frame members A in the following manner: Formed on the fittings C are lateral brackets 3, provided with flanges 4, which engage slots 5, formed in said rods or braces 1. As shown, said flanges 4 are formed at the ends of seats 6 on said brackets, which receive the ends of the members 1 outside of the slots 5. Thus after the uprights have been secured in position the tie-rods or braces 1 can be quickly and conveniently connected thereto by interlocking the slots 5 therein with the flanges 4 on the fittings C, with the ends of said tie-rods or braces resting upon the seats 6 on the brackets 3. At the corners of the structure the brackets 3 are disposed at angles of ninety degrees to each other.

In order that the upright members A of the side walls may be supported more rigidly, they are also connected by tie-rods or braces 7, which are continuous over several of said uprights. As shown, the tie-rods or braces 7 connect said upright frame members A at their upper ends in the following manner: Secured to the upper ends of said upright frame members A, preferably by screw-threads, are fittings D, which comprise brackets 8, provided with flanges 9 and seats 10, which are continuous between the flanges 9. The tie-rods or braces 7 engage the seats 10 and are provided with slots 11 both adjacent to and intermediate their ends, which engage the flanges 9 on any desired number—say four—of fittings D. The fittings D also comprise brackets 12, provided with seats 13 and locking-flanges 14 for engaging roof members, as hereinbefore described, said brackets being disposed at an upward angle corresponding to the pitch of the roof, in the present instance approximately thirty degrees.

For purposes of convenient reference the different forms of joints used for connecting the structural elements will be hereinafter referred to as "threaded joints" and as "bracket-joints," respectively.

The roof of the structure consists of sectional rafter members, which extend from the tops of the side walls to a ridge-pole E and which comprise different forms of rafter members F and F', depending upon the duty imposed upon them, as hereinafter explained.

The rafter members are connected transversely by what may be termed "purlins," which are likewise made in sections G and G' of different forms, as said purlins are supported upon or support the sections of the rafter members. The sectional rafter members and purlins are connected by means of suitable fittings, the connecting-joints comprising threaded and bracket joints, threaded joints being used for connecting all weight-carrying members and bracket-joints being used in all cases for connecting a supported member to a supporting member. For example, the ridge-pole E comprises sections E' and E², of which the sections E' rest upon a bracket-fitting $e$, supported in fixed positions by trusses, as hereinafter described. Excepting at its extreme ends, the ridge-pole sections E² are supported by the sections E' and are connected thereto by fittings $e'$, comprising screw-threaded joints for the sections E', which carry the weight, and bracket-joints for the sections E², which are supported thereby. At the extreme ends of the roof the ridge-pole sections E² are supported upon bracket-fittings similar to the fittings $e$ and supported in the same manner. Likewise the connections of the rafter members to the members A of the side walls and to the ridge-pole E are by bracket-joints, as said joints are merely subjected to a gravity strain due to the weight of the roof structure. The same feature is observed in the different forms of rafter members and of purlins. Thus the rafter members F comprise fittings $f$, screw-threaded to the elements of the rafter members and provided with transverse bracket-joints for the purlins which are supported thereby. Said rafter members F also comprise truss-supported fittings $f'$, substantially similar to the ridge-pole fittings $e$, to which the rafter members and purlins are connected by bracket-joints, said fittings being supported independently thereof. Similarly the rafter members F' comprise fittings $f$, which are provided with screw-threaded joints for said rafter members and fittings $g$, which are screw-threaded to the purlin-sections and are provided with bracket-joints for said rafter members F', which are supported thereupon.

The purlins comprise members G, which are merely sections of pipe provided both at and between their ends with bracket-joints for connection with corresponding fittings, and members G', which consist of sections of pipe connected by the fittings $g$, which are similar to the fittings $f$ and are provided with screw-threaded joints for the pipe-sections and with transverse bracket-joints for connecting intersecting rafter members therewith.

The roof of the structure may be supported in any suitable or desired manner. As shown, it is supported by trusses comprising top chords H, (formed by rafter members F,) bottom chords H', comprising sections $h$ $h'$, connected by fittings $h²$, tension members H², which connect the ridge-pole fittings $e$ with the fittings $h²$ and which preferably consist of sections of pipe connected by turnbuckles to provide for adjusting the tension thereon, and compression members H³, which support the fittings $f'$. The top and bottom chords H H' are connected to each other and to upright frame members A by fittings I, which are substantially identical with the fittings D, heretofore described, excepting that each of them has an additional bracket 15, to which the sections $h$ of the bottom truss-chords H' are connected by screw-joints, and excepting also that instead of being connected to the frame members A by threaded joints they are bored out, so as to slip over the ends of the uprights which they engage. The sections $h'$ of the bottom chords H' of the roof-trusses are connected to the fittings $h²$ by bracket-joints. The fittings $f'$ are screw-threaded to the compression members H³, which are connected to the fittings $h²$ by bracket-joints. With this construction it is obvious that the truss members will consist of substantially straight sections of lengths to be conveniently shipped and handled and that, with the exception of the tension members H², all screw-threaded joints may be assembled at the shops, the fittings $h²$ and I to the sections $h$ of the bottom chords, the fittings $f'$ to the compression members H³, and the tension members H² to the fittings $e$, leaving only the screw-threaded connections between the tension members H² and the fittings $h²$ to be made in erecting the structure. With the fittings $e$ each made in a single piece it is obvious that the tension members H² would diverge therefrom at angles relatively to each other and would be awkward to ship and handle. For this reason I prefer to make the fittings $e$ in two pieces each, a truss tension member H² being connected to each part of said fitting. The sections of said fittings may be secured together in any suitable manner, as shown by interlocking parts 16 and 17 thereon.

It is obvious that in addition to supporting the roof of the structure the roof-trusses will also operate to rigidly connect the opposite walls of the structure and to support the same rigidly against a lateral pressure.

In erecting a building-frame of my invention the uprights A are built up and connected by the tie-rods or braces 1. In erecting the roof the trusses are erected first and the ridge-pole E placed in position. Next the rafter members F', the purlin-sections G', and the purlin-sections G are successively placed in position, which completes the roof structure. In erecting the roof it will probably be necessary to use temporary supports for the roof members, said temporary supports to be removed when the erection of the roof is completed, whereby it becomes a self-supporting structure.

A structure of my invention may be used as a temporary knockdown structure to be erected at different places and which may be quickly and conveniently taken down for removal. For this and similar purposes the sides and roof of the structure will preferably be covered with canvas or light compo-board of suitable character. In this application a structure of my invention possesses particular advantages owing to the quickness and ease with which it may be taken down, moved, and erected. My invention, however, contemplates equally the use of my improved building structure in permanent buildings. In this application after the frame has been erected a concrete wall 18 (indicated in dotted lines in Fig. 6) will be formed around the skeleton-frame structure, which will be embedded therein in whole or in part.

When it is desired to construct a building of more than one story, any desired form of floor structure may be used. In Fig. 7 I have shown an approved form of floor structure consisting of concrete reinforced by rods 19 and 20, disposed in the form of a shallow truss and secured to the uprights A of the structure.

I claim as my invention—

1. A building-frame comprising upright members comprising a plurality of tubular sections, braces and fittings provided with screw-threaded joints for connecting the sections of said upright members and with lateral bracket-joints for connecting said braces to said upright members.

2. A building-frame comprising upright members comprising a plurality of tubular sections, braces and fittings, comprising fittings provided with screw-threaded joints for connecting the sections of said upright members and with lateral bracket-joints for connecting said braces to said upright members, said fittings also comprising fittings secured to the tops of the upright members provided with bracket-joints and braces which connect the same which are continuous over three or more of said upright members.

3. A building-frame comprising upright members, roof-supports carried thereby and a roof structure comprising units which extend in different directions consisting of tubular sections and fittings for connecting said sections, said fittings being provided with screw-threaded joints for the sections of each unit and with transverse bracket-joints for interlocking intersecting roof elements therewith.

4. A building-frame comprising upright members, roof-supports carried thereby comprising fittings provided with bracket-joints and a roof structure comprising units which extend in different directions consisting of tubular sections and fittings for connecting said sections, said fittings being provided with screw-threaded joints for the sections of each unit and with transverse bracket-joints for interlocking intersecting roof elements therewith.

5. A building-frame comprising upright members, fittings secured to the upper ends thereof provided with bracket-joints for connecting elements of the roof structure thereto, roof-supports carried by said upright members comprising fittings provided with bracket-joints supported at intervals along the ridge of the roof, a ridge-pole comprising a plurality of units, the end sections consisting of tubular sections and screw-threaded fittings connecting the same and intermediate sections which are continuous over intermediate ridge-supporting fittings and fittings threaded to the ends thereof provided with bracket-joints for connecting adjacent ridge-pole members thereto, all ridge-pole fittings being provided with lateral bracket-joints for connecting elements of the roof structure thereto and a roof structure comprising units which extend in different directions consisting of tubular sections and fittings for connecting said sections, said fittings being provided with screw-threaded joints for the sections of each unit and with transverse bracket-joints for interlocking intersecting roof elements and said roof structure comprising elements provided with bracket-joints for engagement with the bracket-joints on the ridge-pole fittings and on the fittings secured to the upper ends of the upright frame members.

6. A building-frame comprising upright members, roof-trusses which connect upright members on opposite sides of the structure comprising top and bottom chords each comprising a plurality of units, tension members consisting of sections of pipe and turnbuckles for connecting the same, compression members and fittings for connecting the elements of said trusses with each other and with the upright supporting members, said fittings comprising fittings secured to the upper ends of the upright members provided with bracket-joints for connecting the top truss-chords thereto and with lateral screw-threaded joints for connecting the end sections of the lower truss-chords thereto, ridge-fittings provided with bracket-bearings for the ridge-pole and top chord connections and with screw-threaded connections for the tension truss members, fittings secured to the ends of the compression members of the trusses provided with bracket-bearings for connecting elements of the top truss-chords thereto and with transverse bracket-bearings and fittings for connecting the end and intermediate sections of the lower chords with each other and with the tension and compression members, the outer sections of the lower chords and the tension members being connected thereto by screw-threaded joints and the intermediate sections of the lower chords and the compression members being connected thereto by bracket-joints, a ridge-pole comprising a plurality of units, the end sections consisting of tubular sections and screw-threaded fittings which connect the same and intermediate sections continuous over ridge-fittings of the roof-trusses, fittings threaded to the ends thereof provided with bracket-joints for connecting adjacent ridge-pole members thereto, all ridge-pole fittings being provided with lateral bracket-joints for connecting elements of the roof structure thereto, fittings secured to the upper ends of the upright members of the structure other than those which support the roof-trusses provided with bracket-joints for connecting elements of the roof structure thereto and a roof structure comprising units which extend in different directions consisting of tubular sections and fittings for connecting the same, said fittings being provided with screw-threaded joints for connecting the sections of each unit and with transverse bracket-joints for interlocking intersecting roof elements and said roof structure comprising elements provided with bracket-joints for engagement with the bracket-joints on the ridge-pole fittings and on the fittings secured to the upper ends of the upright frame members.

7. A building-frame comprising upright members, roof-trusses which connect upright members on opposite sides of the structure comprising top and bottom chords each comprising a plurality of units, tension members consisting of sections of pipes and turn-buckles for connecting the same, compression members and fittings for connecting the elements of said trusses with each other and with the upright supporting members, said fittings comprising fittings secured to the upper ends of the upright members provided with bracket-joints for connecting the top truss-chords thereto and with lateral screw-threaded joints for connecting the end sections of the lower truss-chords thereto, ridge-fittings provided with bracket-bearings for the ridge-pole and top-chord connections and with screw-threaded connections for the tension truss members, each of said fittings consisting of separate sections provided with interlocking parts for securing said sections together, fittings secured to the ends of the compression truss members provided with bracket-bearings for connecting elements of the top chords thereto and with transverse bracket bearings and fittings for connecting the end and intermediate sections of the lower chords with each other and with the tension and compression members, the outer sections of said lower chords and the tension members being connected thereto by screw-threaded joints and the intermediate sections of the lower chords and the compression members being connected thereto by bracket-joints, a ridge-pole comprising a plurality of separate units, the end sections consisting of tubular sections and screw-threaded fittings which connect the same and intermediate sections continuous over ridge-fittings of the roof-trusses, fittings threaded to the ends thereof provided with bracket-joints for connecting adjacent ridge-pole members thereto, all ridge-pole fittings being provided with lateral bracket-joints for connecting elements of the roof structure thereto, fittings secured to the upper ends of the upright members of the structure other than those which support the roof-trusses provided with bracket-joints for connecting elements of the roof structure thereto and a roof structure comprising units which extend in different directions consisting of tubular sections and fittings for connecting the same, said fittings being provided with screw-threaded joints for connecting the sections of each unit and with transverse bracket-joints for interlocking intersecting roof elements and said roof structure comprising elements provided with bracket-joints for engagement with the bracket-joints on the ridge-pole fittings and on the fittings secured to the upper ends of the upright frame members.

In testimony that I claim the foregoing as my invention I affix my signature, in presence of two subscribing witnesses, this 29th day of November, A. D. 1904.

CHARLES A. DENNIS.

Witnesses:
   CHAS. G. DADA,
   E. M. KLATCHER.